(12) United States Patent
Gonin et al.

(10) Patent No.: US 12,660,833 B2
(45) Date of Patent: Jun. 23, 2026

(54) PROCESS FOR DEMINERALISING A MILK PROTEIN COMPOSITION, MILK PROTEIN COMPOSITION OBTAINABLE BY SAID PROCESS, AND FACILITY FOR IMPLEMENTING SAID PROCESS

(71) Applicant: Eurodia Industrie, Pertuis (FR)

(72) Inventors: Anne Gonin, Pertuis (FR); Florence Lutin, Pertuis (FR)

(73) Assignee: EURODIA INDUSTRIE, Pertuis (FR)

( * ) Notice: Subject to any disclaimer, the term of this patent is extended or adjusted under 35 U.S.C. 154(b) by 512 days.

(21) Appl. No.: 17/913,348

(22) PCT Filed: Mar. 25, 2021

(86) PCT No.: PCT/EP2021/057801
§ 371 (c)(1),
(2) Date: Sep. 21, 2022

(87) PCT Pub. No.: WO2021/191377
PCT Pub. Date: Sep. 30, 2021

(65) Prior Publication Data
US 2023/0116650 A1 Apr. 13, 2023

(30) Foreign Application Priority Data
Mar. 25, 2020 (FR) ...................................... 2002936

(51) Int. Cl.
*A23C 9/144* (2006.01)
(52) U.S. Cl.
CPC .................................... *A23C 9/144* (2013.01)
(58) Field of Classification Search
CPC .................................................... A23C 9/144
See application file for complete search history.

(56) References Cited

U.S. PATENT DOCUMENTS 3,870,613 A 3/1975 Nakamura et al.
4,146,456 A * 3/1979 Taneya ................... A23C 9/144
424/44
(Continued)

FOREIGN PATENT DOCUMENTS

EP 1053685 A1 11/2000
EP 3597045 A1 * 1/2020 ............. A23C 21/00
(Continued)

OTHER PUBLICATIONS

Shee et al., "Precipitation of Cheddar Cheese Whey Lipids by Electrochemical Acidification," J. Agric. Food Chem., 2005, 53, 5635-5639 (Year: 2005).*
(Continued)

*Primary Examiner* — Jeffrey P Mornhinweg
(74) *Attorney, Agent, or Firm* — ROTHWELL, FIGG, ERNST & MANBECK, P.C.

(57) ABSTRACT

A process for manufacturing a demineralised milk protein composition (MPC2), comprising (i) providing a milk protein composition (MPC); (ii) electrodialysis of the milk protein composition (MPC) on an electrodialyser (5, 200), comprising unit cells (15, 215) comprising three compartments (20, 26, 30; 220, 226, 230) and configured to substitute at least one cation by at least one hydrogen ion H$^+$ in the milk protein composition (MPC) to obtain an at least partially demineralised and acidified milk protein composition (MPC1); (iii) electrodialysis of the milk protein composition (MPC1) obtained in step (ii); and (iv) recovering the demineralised milk protein composition (MPC2).

20 Claims, 3 Drawing Sheets

(56) References Cited

U.S. PATENT DOCUMENTS

| | | | | |
|---|---|---|---|---|
| 4,180,451 | A | | 12/1979 | McRae |
| 4,806,219 | A | * | 2/1989 | Yamamoto ........... B01D 61/445 |
| | | | | 205/508 |
| 4,971,701 | A | | 11/1990 | Keskusosuusliik |
| 5,851,372 | A | | 12/1998 | Noel |
| 6,033,700 | A | | 3/2000 | Berrocal et al. |
| 6,383,540 | B1 | * | 5/2002 | Noel ................... A23C 9/1427 |
| | | | | 210/651 |
| 2009/0142459 | A1 | | 6/2009 | Batchelder |
| 2021/0112821 | A1 | | 4/2021 | Chaveron |

FOREIGN PATENT DOCUMENTS

| | | | |
|---|---|---|---|
| JP | S49-116257 | A | 11/1974 |
| WO | 2016207579 | A1 | 12/2016 |
| WO | 2019180389 | A1 | 9/2019 |

OTHER PUBLICATIONS

Faucher et al., "Defatting of sweet whey by electrodialysis with bipolar membranes: Effect of protein concentration factor," Separation and Purification Technology, 251 (2020) 117248, 1-15 (Year: 2020).*
Japanese Office Action issued in Application No. 2022-557721, dated Dec. 10, 2024, 11 pages.
International Search Report for PCT/EP2021/057801 mailed Jun. 10, 2021, 8 pages.

* cited by examiner

[Fig. 1]
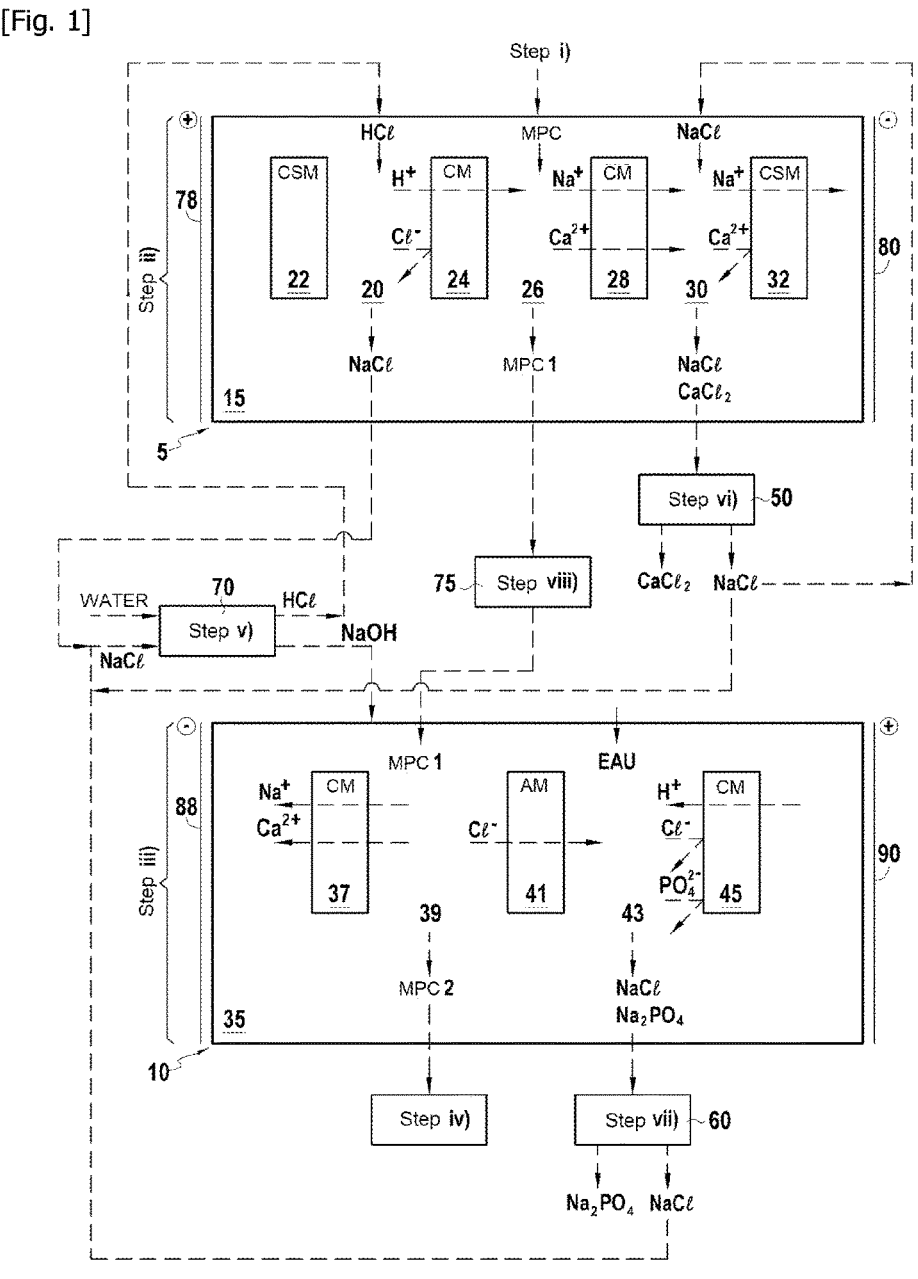

[Fig. 2]

[Fig. 3]
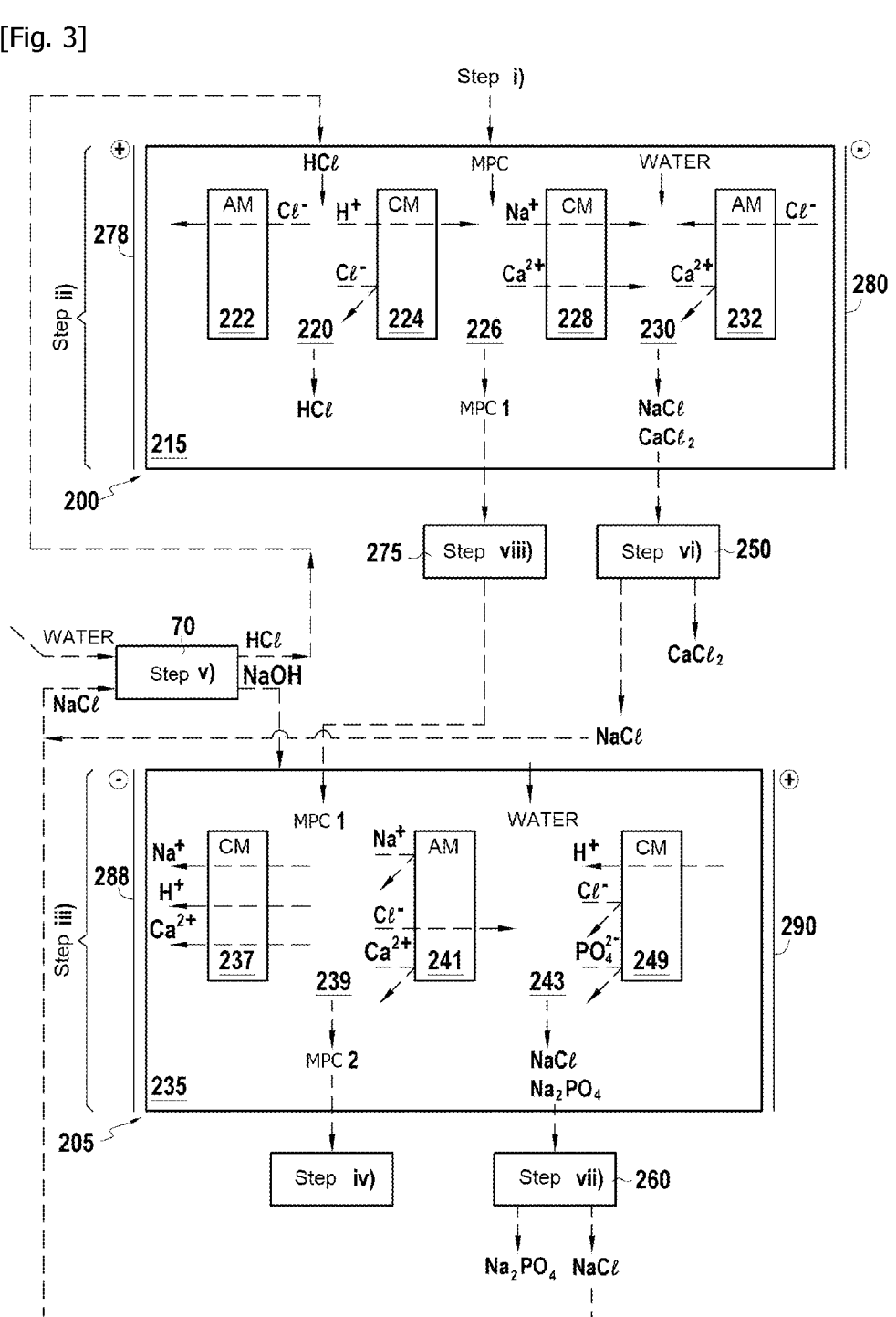

PROCESS FOR DEMINERALISING A MILK PROTEIN COMPOSITION, MILK PROTEIN COMPOSITION OBTAINABLE BY SAID PROCESS, AND FACILITY FOR IMPLEMENTING SAID PROCESS

CROSS REFERENCE TO RELATED APPLICATIONS

This application is a 35 U.S.C. § 371 National Stage of International Patent Application PCT/EP2021/057801 filed Mar. 25, 2021, designating the United States, which claims priority to and the benefit of French Patent Application No. FR2002936 filed Mar. 25, 2020, the entire contents of which are incorporated herein by reference

TECHNICAL FIELD

The present invention relates to a process for demineralisation a milk protein composition, and to the milk protein composition obtainable by this process, in particular demineralised whey.

The present invention also concerns a facility for implementing the process for demineralising a milk protein composition.

BACKGROUND

A milk protein composition may be whey. Whey is the liquid part resulting from the coagulation of milk. Two types of whey can be distinguished in particular: those resulting from the manufacture in an acid medium of caseins or fresh cheeses (acid whey); and those resulting from the manufacture of caseins using rennet and cooked or semi-cooked pressed cheeses (sweet whey).

Whey primarily consists of water, lactose, proteins, in particular serum proteins, and minerals. Value can be added to whey by isolating both the lactose and the proteins. Whey proteins can also have added value as an ingredient in the manufacture of infant formula. Demineralised whey, in particular lactose, can be used in the manufacture of confectionery, cakes and ice creams, prepared dishes, pastries, etc.

Whey can be demineralised by undergoing a nanofiltration step, followed by electrodialysis or passage over cation-exchange and anion-exchange resins to achieve demineralisation rates of 70 to 90%, or even higher.

However, ion-exchange resins generate large volumes of saline regeneration effluent that are difficult and costly to treat.

At the same time, consumers are increasingly looking for ingredients from the food processing industry that preserve their initial natural properties and, therefore, are not modified and/or denatured, or in any case as little as possible. In addition, processes for demineralising milk products, which limit or even eliminate the presence of exogenous mineral species, are also sought. In fact, ion-exchange resins work by exchanging mineral species in the composition to be treated against exogenous mineral species. However, eliminating one or more passages on ion-exchange resins complicates the production of highly demineralised milk protein compositions, for example demineralised to 70%, 80% or 90%. As the demineralisation is transferred to other treatment systems, there is a risk that the membranes of these systems will clog more quickly because of the high mineral load.

The present invention thus aims to propose an improved process for demineralising a milk protein composition, in particular without using ion-exchange resins (anionic and/or cationic).

The present invention also aims to propose a process for demineralising a milk protein composition that limits the introduction of exogenous mineral compounds into the milk protein composition.

SUMMARY OF THE INVENTION

The present invention overcomes the above-mentioned problems in that it has as its subject matter, according to a first aspect, a process for manufacturing a demineralised milk protein composition (MPC2), comprising the following steps, in particular carried out in series:

(i)—providing a milk protein composition (MPC);

(ii)—electrodialysis of the milk protein composition (MPC) on an electrodialyser comprising unit cells comprising, in particular consisting of, three compartments and configured to substitute at least one cation by at least one hydrogen ion $H^+$ in the milk protein composition (MPC) to obtain an at least partially demineralised and acidified milk protein composition (MPC1);

(iii)—electrodialysis of the milk protein composition (MPC1) obtained in step (ii);

(iv)—recovering the demineralised milk protein composition (MPC2).

In general, during electrodialysis, dissolved ionised mineral or organic species, such as salts, acids or bases, are transported through ionic membranes under the action of an electric current. An electrodialysis unit may comprise cationic (cation-permeable) membranes CEM and/or anionic (anion-permeable) membranes AEM arranged in parallel and alternating fashion. Under the action of the electric field applied by means of an anode and a cathode, the CEMs block anions and allow cations to pass, while the AEMs block cations and allow anions to pass.

Concentration compartments (concentrates) and desalination compartments are thus created. This most-common type of electrodialysis is an electrodialysis in which the basic unit cell comprises two compartments. The unit cell corresponds to the smallest repetition pattern of the concentration and desalination operations (one compartment corresponding to one concentration or desalination). The solutions are renewed in the compartments by a circulation parallel to the plane of the membranes. The application of a current is provided by two electrodes parallel to the plane of the membranes and placed at the ends of the electrodialyser.

Advantageously, and in a novel manner, the present invention comprises the use of an electrodialyser comprising three compartments for performing step (ii) configured to allow a substitution of cations. Thus, in addition to the desalination compartments (in which the ions disappear) and the concentration compartments (in which the ions accumulate), the electrodialyser of step ii) comprises cationic conversion compartments.

The milk protein composition (MPC) obtained in step ii) is thus depleted in cations, and thus acidified (with a drop in pH).

The second electrodialysis (iii) is carried out on an electrodialyser comprising cells (each) comprising (consisting of) two compartments. A first compartment receives the milk protein composition to be treated (MPC1), and a second compartment initially receives the electrodialysis (iii) of the water. The water will be loaded with salts of ions extracted from the milk protein composition (MPC1) in order to form a brine.

The electrodialysis (iii) makes it possible to perfect the extraction of cations, and allows the extraction of anions not extracted by the first electrodialysis.

The demineralisation obtained for the recovered milk protein composition (MPC2) is intensive, and may reach a demineralisation rate greater than or equal to 70%, in particular greater than or equal to 75%, or 80% or even 85%, more particularly greater than or equal to 90%.

Advantageously, the process according to the invention does not generate regeneration effluents to be treated, does not consume exogenous acid, or consumes very little according to the different variants developed below, and is therefore less polluting.

This process can be described as partially eco-efficient.

The milk protein composition obtained in step ii) has an acid pH, in particular less than or equal to the isoelectric point of the proteins (in particular serum proteins) of the MPC of step i), in particular less than or equal to 6, preferably less than or equal to 4.

This provision promotes the control of microbiological stability. In addition, the milk protein composition can then undergo heat treatment (in particular pasteurisation) under conditions of temperature and duration different from those applied in a non-acidic environment, which limits protein denaturation. The milk proteins are therefore advantageously less degraded.

Preferably, the temperature of the milk protein composition in step ii) and/or step iii) is less than or equal to 40° C., in particular greater than 0° C.

The milk protein composition recovered in step iv) has a pH greater than or equal to 5, in particular greater than or equal to 6, more particularly less than or equal to 6.2, in particular less than or equal to 8.

Milk Protein Composition

Preferably, the milk protein composition is selected from: whey, such as sweet whey or acid whey or a mixture thereof; milk ultrafiltration permeate; milk microfiltration permeate (or also designated as ideal or native whey); whey ultrafiltration retentate or permeate; milk microfiltration permeate ultrafiltration retentate or permeate; or a mixture thereof (List I).

All of the milk protein compositions listed in list I are considered to be whey or whey derivatives.

In an embodiment, the milk protein composition (MPC) and/or the sweet whey and/or the acid whey and/or the native whey is/are raw, i.e., it/they has/have not undergone any operation to reduce its/their mineral load.

The whey or milk protein composition (MPC), mentioned without precision, may thus be raw or partially demineralised.

Sweet whey is preferably obtained by chemical treatment of the milk, in particular using rennet, to recover both the caseins and the sweet whey.

Acid whey is preferably obtained by acid treatment of the milk, in particular using lactic acid and/or hydrochloric acid, to recover both the caseins and the acid whey.

The, in particular raw or partially demineralised, milk protein composition (MPC) and/or the, in particular raw or partially demineralised, whey can be pre-concentrated in order to increase its dry extract, mechanically (for example by reverse osmosis or nanofiltration or a combination thereof) or thermally (for example by evaporation of the water).

The, in particular raw or partially demineralised, milk protein composition (MPC) and/or the, in particular raw or partially demineralised, acid whey and/or the, in particular raw or partially demineralised, sweet whey and/or the, in particular raw or partially demineralised, milk microfiltration permeate has/have a dry extract greater than 0% and less than or equal to approximately 16%, in particular less than or equal to approximately 6%.

The, in particular raw or partially demineralised, milk protein composition (MPC) and/or the, in particular raw or partially demineralised, acid whey and/or the, in particular raw or partially demineralised, sweet whey and/or the, in particular raw or partially demineralised, milk microfiltration permeate, can undergo a pre-concentration step, as defined above, in order to have a dry extract greater than or equal to approximately 8% and less than or equal to approximately 32%.

The milk protein composition according to the invention is liquid when used. It can be obtained by reconstituting a liquid solution from powder(s) and/or liquid(s), in particular selected from List I above.

Preferably, the milk protein composition in step i) is partially demineralised. This arrangement makes it possible to reduce the size of the three-compartment electrodialyser in step ii) and/or the size of the two-compartment electrodialyser in step iii), i.e., the active membrane surface. Preferably, the demineralisation rate of the milk protein composition in step i) is greater than or equal to 30%.

Preferably, the demineralisation rate of the milk protein composition in step i) is less than or equal to 70%, preferably less than or equal to 60%, for example less than or equal to 50%.

Preferably, the demineralisation rate of the milk protein composition obtained/recovered in step iv) is greater than or equal to 70%, in particular greater than or equal to 80% (DM80) or 85% (DM85), more particularly greater than or equal to 90% (DM90).

In an embodiment, the milk protein composition has a dry extract by mass of greater than 1%, preferably greater than or equal to 5%, and less than or equal to 10%. For example, it is a non-concentrated whey.

In another embodiment, the milk protein composition has a dry extract by mass greater than or equal to 10%, and less than or equal to 30%; preferably greater than or equal to 15% and less than or equal to 25%. It is, for example, a concentrated whey. The concentration of the dry matter of the whey can be carried out by reverse osmosis, nanofiltration or any other thermal concentration method.

In general, the milk protein composition may be derived from any dairy female.

Preferably, the milk protein composition is derived from a milk selected from: cow's milk, goat's milk, sheep's milk, donkey's milk, buffalo milk, mare's milk, or a mixture thereof, still more preferably selected from: cow's milk, goat's milk and sheep's milk or a mixture thereof, in particular it is cow's milk.

The protein composition comprises milk proteins, in particular serum proteins.

The milk protein composition (MPC), in particular the whey comprises serum proteins and does not comprise caseins remaining in the bulk (coagulated) part during milk processing and/or in the milk microfiltration retentate.

Preferably, the in particular raw sweet whey, or in particular raw native whey, has one of the following properties, alone or in combination:

a pH between 5.8 and 6.5;

the ratio of the mass of lactose to the mass of the dry extract is greater than or equal to 70%, in particular greater than or equal to 74%;

the ratio of the mass of nitrogenous matter to the mass of the dry extract is greater than or equal to 10%, in particular greater than or equal to 12%, in particular less than or equal to 30%;

the ratio of the mass of ash to the mass of the dry extract is greater than or equal to 8%, in particular less than or equal to 10%; and the ratio of the mass of organic acids to the mass of the dry extract is greater than or equal to 2%, in particular less than or equal to 5%.

Preferably, the, in particular raw, acid whey has one of the following properties, alone or in combination:

a pH less than or equal to 5, in particular less than or equal to 4.5;

the ratio of the mass of lactose to the mass of the dry extract is greater than or equal to 55%, in particular less than or equal to 65%, in the case of whey derived from the manufacture of cheeses in an acid medium;

the ratio of the mass of lactose to the mass of dry extract is greater than or equal to 70%, in particular less than or equal to 85%, in the case of whey derived from the manufacture of caseins in an acid medium;

the ratio of the mass of total nitrogenous matter (TNM) to the mass of the dry extract is greater than or equal to 4%, in particular less than or equal to 12%;

the ratio of the mass of ash to the mass of the dry extract is greater than or equal to 10%, in particular less than or equal to 15%; and the ratio of the mass of organic acids to the mass of the dry extract is greater than or equal to 10%, in particular less than or equal to 20%, in the case of whey derived from the manufacture of cheeses in a lactic acid medium;

the ratio of the mass of organic acids to the mass of the dry extract is greater than or equal to 2%, in particular less than or equal to 5%, in the case of whey derived from the manufacture of caseins in an acid medium.

In an embodiment the ratio of the mass of lactose to the mass of dry extract of the MPC (step i) is greater than or equal to 50%, or 60% or 70%.

In an embodiment, the ratio of the mass of total nitrogenous matter to the mass of the dry extract of the MPC (step i) is greater than or equal to 5%, or 10%, in particular greater than or equal to 12%, in particular less than or equal to 30%.

Demineralisation consists essentially in the total or partial removal of the ash present in the milk protein composition, particularly the whey.

Definitions—Measurement Methods

The ash content (or dry mass fraction of ash) in particular of the milk protein composition (MPC, MPC1, MPC2) can be determined with the standardised method NF V04-208 October 1989, entitled "Milk—Determination of ash—Reference method", in particular using an incineration method at 525° C.

In the present text, dry extract by mass or total dry mass is understood to mean the dry mass, for example, of the milk protein composition (MPC, MPC1, MPC2), obtained after evaporation of the water until a total dry mass is obtained based on the total mass of the milk protein composition, particularly at atmospheric pressure. The dry extract by mass can be determined with the standardised method ISO 6731: January 2011, "Milk, cream, and unsweetened condensed milk—Determination of dry matter (Reference method)".

In the present text, lactose is understood to mean lactose as defined in the Codex Alimentarius, Codex Stan 212-1999: a natural constituent of milk normally obtained from whey, in particular with an anhydrous lactose content greater than or equal to 99.0% mass/mass on a dry basis.

The determination of the mass content of lactose or of sugar (or dry mass fraction) can be carried out by high-performance liquid chromatography, in particular using standard NF ISO 22662, dated November 2007.

The methods which can be used in order to quantify the cations and anions of milk (calcium, magnesium, sodium, potassium, phosphorus/phosphate, citrate) can be selected among the following methods: molecular absorption spectrometry, titrimetric/complexometric method, electrochemical method, atomic spectrometry, capillary electrophoresis, ionic chromatography/conductimetric detection, nuclear magnetic resonance for $^{31}$P, enzymatic method/UV detection.

The dry mass fraction of total nitrogenous matter (TNM) can be determined using standard NF EN ISO 8968-1 dated May 2014 (Kjeldhal method).

The following standards can be used to determine the mass content: for example of chlorides: potentiometric titration method (NF ISO 21422, February 2019); for example of total phosphorus: molecular absorption spectrometry method (NF ISO 9874, April 2008); for example of calcium: titrimetric method (standard ISO 12081:2010); for example of calcium, sodium potassium and magnesium: atomic absorption spectrometry method (standard ISO 8070:2007) or ionic chromatography; for example of lactic acid/lactate via the standard ISO 8069 dated 2005.

In the present text, MPC designates the milk protein composition according to the invention.

Preferably, the milk protein composition (or MPC) in step i) has a conductivity of greater than or equal to 1 mS/cm, more preferably greater than or equal to 3 mS/cm, preferably greater than or equal to 8 mS/cm, in particular greater than or equal to 10 mS/cm.

Preferably, the MPC, recovered in step iv), has a mass content of ash less than or equal to 2.5% with respect to the dry extract, preferably less than or equal to 1.5% with respect to the dry extract, more preferably less than or equal to 1% with respect to the dry extract, preferably less than or equal to 0.60% with respect to the dry extract.

Preferably, the milk protein composition comprises the following cations:

calcium, magnesium, sodium and potassium, which are the cations targeted in particular by the demineralisation process according to the invention.

Preferably, the milk protein composition comprises the following anions: chloride, phosphate, sulfate, lactate, acetate and citrate, which are the anions targeted in particular by the demineralisation process according to the invention.

In an embodiment, the monovalent cations and monovalent anions are at least partially extracted from the MPC in a preliminary demineralisation step, prior to step i), comprising a nanofiltration or reverse osmosis step Advantageously, the process does not comprise an anionic substitution step carried out on an electrodialyser comprising cells each comprising three compartments, in particular configured to substitute at least one anion by at least one hydroxyl ion OH$^-$ in the milk protein composition, in particular MPC1.

Advantageously, the process does not comprise a substitution step for, in particular exclusively, anions carried out on an electrodialyser.

Advantageously, the process does not comprise an anionic substitution step carried out on an electrodialyser comprising cells comprising compartments receiving the milk protein composition MPC1, in which each of the compartments is delimited between two anionic membranes.

In a variant, the process comprises the addition of at least one basic solution, in particular the addition of at least one solution comprising at least one basic salt, to the milk protein composition during step (iii), in particular during at least one part of step (iii), and/or after step (iii).

In an embodiment, the basic solution is a sodium hydroxide (NaOH) solution or a potassium hydroxide solution, or a mixture of said solutions.

In an embodiment, the basic solution comprises at least 0.5%, preferably at least 1% or 3% or 5%, by mass of the base (for example NaOH and/or KOH) relative to its total mass (including water).

In a first embodiment, a basic solution is added to the milk protein composition after step (iii), then the milk protein composition (MPC2), for which the pH has been adjusted, is recovered. This may be a standardisation. The recovered MPC2 comprises the ions, in particular the cations, of the added basic salts. Depending on the desired mineral profile, this MPC2 may be suitable for certain applications.

In a second embodiment, optionally in combination with the first embodiment, a basic solution is added in the compartments of the electrodialyser of step (iii) comprising the milk protein composition MPC1.

The rise in pH is then preferably carried out during the electrodialysis (iii). Advantageously, said at least one basic solution can be added continuously or sequentially, in particular until the desired pH and/or the targeted conductivity is obtained.

Advantageously, said at least one basic solution is food grade.

Advantageously, the rise in pH during step iii), in particular so as to be greater than or equal to the pKa of at least one organic acid of the treated composition, makes it possible to obtain the anionic form of the organic acid and thus of the extract through the anionic membranes in step iii).

The mobility of the anions is improved, and their extraction is thus facilitated.

This addition can be carried out on stopping the electrodialyser (iii) (therefore switched off), then adding the basic solution to the MPC1, then restarting the electrodialyser; or concomitantly with the extraction of the ions (therefore switched on).

Advantageously, the addition of the basic solution during step (iii) is carried out when the conductivity (mS/cm) of the milk protein treated composition is lowered by at least 50%, preferably at least 75% relative to the conductivity of the milk protein composition of step (i).

In a variant, the addition of the basic solution is carried out during at least one part of electrodialysis step (iii) concomitantly with the extraction of ions, in particular cations and anions.

In addition to improving the extraction of anions, the inventors have observed that this arrangement improves the extraction of divalent cations ($Ca^{2+}$; $Mg^{2+}$), in particular relative to a demineralisation process using an, in particular exclusively, cationic substitution on a three-compartment electrodialyser (ESC), followed by a conventional ED and an, in particular exclusively anionic, substitution on a three-compartment electrodialyser (ESA).

Advantageously, the addition of the basic solution is carried out during, in particular at least one part of electrodialysis step (iii), under the application of an electric field.

The electric field is generated by the application of a voltage (Volts) between the electrodes, anode and cathode, of the electrodialyser (iii).

In a variant, the addition of the basic solution to the milk protein composition is carried out when the milk protein composition has a conductivity less than or equal to 1 mS/cm, and preferably has a pH greater than or equal to 3.

Advantageously, the addition of the basic solution to the milk protein composition is carried out when the milk protein composition has a conductivity less than or equal to 0.5 mS/cm, and preferably has a pH greater than or equal to 4.

In a variant, after the addition of the basic solution, the milk protein composition has a pH greater than or equal to 4.5, preferably greater than or equal to 5.0.

In an embodiment, the milk protein composition (MPC2) recovered after step (iii) has a pH less than or equal to 6.

It is then possible to standardise the MPC2 by a further addition of a basic solution if it is necessary to adjust the pH between 6 and 7.

In an embodiment, the milk protein composition (MPC2) recovered after step (iii) has a pH greater than or equal to 6 after step (iii). The concentration of the basic solution and its duration of application during step (iii) are adjusted to attain this pH.

In a variant, electrodialysis step (iii) comprises the extraction of anions and cations.

In a variant, step (ii) is an exclusively cation substitution step.

In a variant, the electrodialyser of step (ii) comprises cells (each) comprising (consisting of) three compartments, and the milk protein composition (MPC) circulates in the compartments (each) delimited between two cationic membranes.

In a variant, the milk protein composition recovered in step (iv) (MPC2) comprises phosphate ions ($H_2PO_4^-$, $HPO_4^{2-}$, $PO_4^{3-}$) for which the mass of phosphorus is greater than or equal to 110 mg, preferably greater than or equal to 150 mg, for 100 g of total dry mass of said recovered milk protein composition (MPC2).

Advantageously, the recovered milk protein composition (MPC2) comprises phosphate ions ($H_2PO_4^-$, $HPO_4^{2-}$, $PO_4^{3-}$) for which the mass of phosphorus is less than or equal to 210 mg, for 100 g total dry mass of said recovered milk protein composition (MPC2).

The mass of the phosphate ions is calculated on the basis of the phosphorus.

The ionic profile of the recovered MPC2 also comprises more phosphate ions than when the process comprises, after step (ii), an electrodialysis step for extraction of anions and cations, then an electrodialysis step for exclusively anionic substitution.

In a variant, the milk protein composition recovered in step (iv) (MPC2) comprises sodium or potassium ions, for which the mass is greater than or equal to 20 mg, preferably greater than or equal to 30 mg, for 100 g total dry mass of said recovered milk protein composition (MPC2).

In a variant, the milk protein composition recovered in step (iv) (MPC2) comprises sodium or potassium ions, for which the mass is less than or equal to 80 mg, preferably less than or equal to 60 mg, for 100 g total dry mass of said recovered milk protein composition (MPC2).

In an embodiment, the milk protein composition (MPC2) comprises sodium and/or potassium ions from said at least one added basic solution.

In a variant, the compartments of the electrodialyser of step (ii) receiving the milk protein composition (MPC) are each delimited between two cationic membranes.

In a variant, the manufacturing process comprises a treatment step (v) of at least one part of the one or more salts selected from the following salts:

the salt(s) derived directly from electrodialysis step ii), the salt(s) derived indirectly from electrodialysis step ii), the salt(s) derived directly from electrodialysis step iii), the salt(s) derived indirectly from electrodialysis step iii), the salt(s) from a preliminary demineralisation step carried out on the milk protein composition before step i), a mixture of the latter, said treatment step (v) being configured to produce one or more acid salts on the one hand, and/or one or more basic salts on the other hand.

That the salt is derived directly from step ii) and/or iii) and/or i) is understood to mean that the latter has not undergone a step vi) or vii) defined below, in particular a nanofiltration step.

That the salt is derived indirectly from step ii) and/or iii) and/or i) is understood to mean that the latter has undergone a step vi) or vii) defined below, in particular a nanofiltration step.

The salt(s) used in the process according to the invention is/are preferably selected from: a chloride of a monovalent cation; a chloride of a divalent cation; in particular sodium chloride, potassium chloride and calcium chloride; a sulfate of a monovalent cation, a sulfate of a divalent cation; in particular sodium sulfate, potassium sulfate and calcium sulfate; a phosphate of a monovalent cation, a phosphate of a divalent cation; in particular sodium phosphate, potassium phosphate, and calcium phosphate; and a mixture thereof.

In a variant, treatment step (v) consists of an electrodialysis step carried out on a bipolar membrane electrodialyser.

Advantageously, a bipolar membrane is composed of a cation-exchange layer and an anion-exchange layer separated by a hydrophilic junction.

In a variant, the bipolar membrane electrodialyser, in step (v), comprises unit cells comprising three compartments A, B and C, compartments A and B are supplied with water and compartment C is supplied with said salt(s), in particular compartment C is arranged between the compartments A and B.

Preferably, the salt or salts is/are sodium chloride and/or potassium chloride (NaCl and/or KCl).

In an embodiment, the unit cells of the electrodialyser in step v) each comprise a first compartment delimited between a bipolar membrane and an anionic membrane, a second compartment delimited between an anionic membrane and a cationic membrane, and a third compartment delimited between a cationic membrane and a bipolar membrane.

Preferably, the first compartment and the third compartment are supplied with water, and the second compartment, arranged between the first and third compartments, is supplied with salt(s).

Advantageously, step v), in particular the bipolar membrane electrodialysis step v), generates an acid, in particular hydrochloric acid and/or sulfuric acid, and a base, in particular sodium hydroxide and/or potassium hydroxide, from the flows of salt(s) derived from steps ii) and/or iii).

This arrangement makes it possible to carry out the electrodialysis steps ii) and/or iii) with acid or basic salts from the milk protein composition itself.

The process thus makes it possible to eliminate, or at least to reduce very significantly, the introduction of exogenous mineral compounds.

The salt(s), in particular the sodium chloride salt, may also originate, in part, from the preliminary demineralisation step(s) applied to the milk protein composition in step i), in particular derived from a nanofiltration.

In a variant, at least some of the one or more salts, in particular of hydrochloric acid and/or of sulfuric acid, obtained during treatment step (v), is/are supplied to one of the three compartments of the electrodialyser in step ii).

In a variant, the basic solution added comprises at least in part (is) the basic salt or the basic salts, in particular sodium hydroxide and/or potassium hydroxide, obtained during treatment step (v).

Advantageously, the base used is derived from the MPC itself, which avoids the addition of an exogenous base.

In a variant, the basic solution is derived at least in part from the recycling of an effluent derived from step ii) and/or step iii).

Effluent is understood as a brine derived from ED (ii) or ED (iii).

Advantageously, the recycling is carried out by means of step v).

In a variant, the milk protein composition is selected from the list comprising: whey, such as sweet whey or acid whey or a mixture thereof; a milk, in particular skimmed milk, an ultrafiltration permeate; a milk microfiltration permeate (also designated as native or ideal whey); a whey retentate or ultrafiltration permeate; a milk microfiltration permeate ultrafiltration retentate or permeate; or a mixture thereof, preferably whey.

In a variant, the electrodialysis step ii) produces a mixture comprising at least one, in particular chloride, salt of a monovalent cation, such as a sodium chloride salt and/or a potassium chloride salt, and at least one, in particular chloride, salt of a divalent cation, such as a calcium chloride (CaCl2) salt, and said mixture undergoes a separation step (vi), in particular a nanofiltration step.

Advantageously, the separation step (vi) enables the separation of the one or more salts of a monovalent cation, and of the one or more salts of a divalent cation.

In a variant, step (iii) comprises the electrodialysis of the at least partially demineralised and acidified milk protein composition (MPC1) obtained in step ii) on an electrodialyser comprising unit cells (each) comprising (consisting of) two compartments.

The electrodialyser comprises a plurality of cells, for example at least five cells, preferably at least five cells, more preferably at least 25 cells.

In a first embodiment, the electrodialyser comprises at least one unit cell comprising a first compartment delimited between a cationic membrane and an anionic membrane, and a second compartment delimited between an anionic membrane, in particular that of the first compartment, and a cationic membrane, in particular that of the first compartment.

Preferably, the first compartment is supplied with the partially demineralised and acidified milk protein composition (MPC1) obtained in step ii). Preferably, the second compartment is supplied with water.

This step advantageously allows the extraction of both the anions and cations in MPC1.

This two-compartment electrodialysis step carried out after step ii) also makes it possible to obtain a rate of removal of more than 80%, 85% or 90% in cations and anions, in particular with the addition of sodium hydroxide.

Step (ii) can be carried out before heat treatment step viii) described below in the present text.

In a variant, electrodialysis step iii) produces a mixture comprising at least one salt of a monovalent anion and/or cation and/or at least one salt of a divalent anion and/or cation, in particular a sodium chloride salt (NaCl) and/or a sodium phosphate salt, and this mixture undergoes a separation step (vii), in particular a nanofiltration step.

Advantageously, the separation step (vii) enables the separation of the one or more salts of a monovalent anion, and one or more salts of a divalent anion.

Advantageously, steps vi) and/or vii), described in the present text, make it possible to complete the bipolar membrane electrodialysis, in particular if step ii) is carried out without permselective membranes, by avoiding the precipitation of divalent cations, in particular calcium and/or magnesium, on the membranes, in particular on the cationic membranes of the bipolar electrodialysis of step v).

In a variant, the salt of a monovalent cation, in particular the chloride salt of a monovalent cation, preferably sodium chloride, collected at the conclusion of the separation step (vi) and/or the separation step (vii), is supplied to the electrodialysis step ii).

This arrangement applies in particular when step (ii) is carried out with permselective membranes as defined below.

In a variant, the salt of a monovalent cation, in particular the chloride salt of a monovalent cation, preferably sodium or potassium chloride, collected at the conclusion of the separation step (vi) and/or the separation step (vii) undergoes, at least in part, the treatment step (v).

This arrangement applies in particular when step (ii) is carried out without permselective membranes as defined below.

Advantageously, treatment step (v) allows the production of a basic salt of said monovalent cation, in particular sodium hydroxide or potassium hydroxide.

Advantageously, the basic salt derived from treatment step (v) is used, in particular at least in part, as said at least one basic solution according to the invention.

In a variant, the electrodialyser in step ii) comprises at least one membrane permselective to monovalent cations.

Thus, the membrane permselective to monovalent cations (or to monovalent anions), is crossed only by monovalent cations (or by monovalent anions), and is not crossed by anions (or cations), and cations (or anions) having a valence greater than 1, in particular divalent.

In a variant, the unit cells, comprising three compartments, of the electrodialyser in step ii) comprise at least one unit cell comprising, preferably each of the unit cells comprises:

a first compartment delimited between a membrane permselective to monovalent cations and a cationic membrane;

a second compartment delimited between two cationic membranes; and a third compartment delimited between a cationic membrane and a membrane permselective to monovalent cations.

In another variant, the unit cells, comprising three compartments, of the electrodialyser in step ii) comprise at least one unit cell comprising, preferably each of the unit cells comprises:

a first compartment delimited between an anionic membrane and a cationic membrane;

a second compartment delimited between two cationic membranes, and a third compartment delimited between a cationic membrane and an anionic membrane.

Step (ii) of cationic substitution can thus be carried out using permselective membrane(s) or not.

In a sub-variant (of the variants of step ii) above), the first compartment is supplied with at least one acid salt, preferably a hydrochloric acid salt, the second compartment is supplied with the milk protein composition of step i), and the third compartment is supplied with at least one chloride salt of a monovalent cation, preferably sodium, or with water.

In a variant, the process comprises a heat treatment step (viii), performed after step (ii) and preferably before step (iii).

Preferably, in this step (viii), the milk protein composition is at a temperature greater than or equal to 70° C. and less than or equal to 110° C., for a time greater than or equal to 5 seconds and less than or equal to 10 minutes.

Advantageously, the heat treatment step is a pasteurisation step.

The acidic medium of the milk protein composition promotes the elimination of germs, including those that are more difficult to destroy, such as spore germs.

In a variant, the milk protein composition in step i) is whey, in particular derived from organic farming.

In a variant, the milk protein composition in step i) is partially demineralised whey, in particular having undergone at least one step selected from: a nanofiltration step, a reverse osmosis step, an evaporation step, and a combination thereof.

These steps also concentrate the MPC, i.e. increase its dry extract by mass.

The subject matter of the present invention, according to a second aspect, relates to a demineralised milk protein composition obtainable by any of the embodiment variants with reference to the first aspect of the invention.

In a variant, said milk protein composition comprises phosphate ions ($H_2PO_4^-$, $HPO_4^{2-}$, $PO_4^{3-}$) for which the mass of phosphorus is greater than or equal to 110 mg, preferably greater than or equal to 150 mg, for 100 g total dry mass of said recovered milk protein composition (MPC2), and comprises sodium or potassium ions, for which the mass is greater than or equal to 20 mg, preferably greater than or equal to 30 mg, for 100 g total dry mass of said recovered milk protein composition (MPC2), preferably the sodium and/or potassium ions are at least in part recycled and/or exogenous.

Advantageously, said milk protein composition comprises phosphate ions ($H_2PO_4^-$, $HPO_4^{2-}$, $PO_4^{3-}$) for which the mass of phosphorus is less than or equal to 210 mg, for 100 g total dry mass of said recovered milk protein composition (MPC2), and comprises sodium or potassium ions, for which the mass is less than or equal to 80 mg, preferably less than or equal to 60 mg, for 100 g total dry mass of said recovered milk protein composition (MPC2).

Preferably, the sodium and/or potassium ions are derived from at least the added basic solution, in particular from the basic salt recycled in step (v).

Preferably, the sodium and/or potassium ions are, at least in part, recycled ions derived from said demineralised milk protein composition.

Preferably, the sodium and/or potassium ions are, at least in part, ions exogenous to said demineralised milk protein composition.

Recycled ions are understood to be the ions extracted from the milk protein composition and which have been added to the latter.

Exogenous ions are understood to be ions that are not derived from the milk protein composition.

The demineralisation rate of the milk protein composition is greater than or equal to 80%, or 85% or 90%.

The subject matter of the present invention, according to a third aspect, relates to a facility for implementing the process according to any of the embodiment variants according to a first and/or second aspect of the invention, comprising:

a) a first electrodialyser comprising a first inlet intended to receive a milk protein composition (MPC), said electrodialyser comprising unit cells (each) comprising (consisting of) three compartments, and configured to substitute at least one cation by at least one hydrogen ion $H^+$ in the milk protein composition (MPC), and a first outlet for an at least partially demineralised and acidified milk protein composition (MPC1);

b) a second electrodialyser comprising a first inlet intended to receive the milk protein composition (MPC1) obtained in step (ii), and a first outlet for the milk protein composition (MPC2).

The first electrodialyser enabling the performance of step (ii) and the second electrodialyser enabling the performance of step (iii).

The first electrodialyser and/or the second electrodialyser may comprise any one of the variants/embodiments described above with reference to the first aspect of the invention, in particular concerning the electrodialysers of steps (ii) and (iii).

In a variant, the facility comprises:

c) a device comprising a basic solution and configured to be in fluid communication during a given period with the compartments of the second electrodialyser that are intended to receive the milk protein composition (MPC1), preferably under the application of an electric field.

Advantageously, the device supplies said at least one basic solution to the compartments of the second electrodialyser receiving MPC1 concomitantly with the extraction of the anions and cations of MPC1 for a determined duration.

In a variant, the first electrodialyser comprises a second inlet intended to receive at least one acid salt, in particular a hydrochloric acid salt and/or a sulfuric acid salt, and a third inlet intended to receive water or a salt, in particular a chloride salt of a monovalent cation (NaCl and/or KCl).

In a variant, the facility comprises a treatment unit (v), in particular an electrodialyser comprising cells comprising three compartments and bipolar membranes.

In a variant, said treatment unit (v) comprises a first inlet receiving water and a second inlet receiving a monovalent cation salt (NaCl, KCl), and a first outlet for an acid salt (HCl), and a second outlet for a basic salt (NaOH and/or KOH).

In an embodiment, said basic salt is supplied to said device c) comprising a basic solution.

In an embodiment, the acid salt is supplied to the second inlet of the first electrodialyser a).

In a variant, the facility comprises a unit for separation of salts, in particular for performing step (vi) or of step (vii).

Preferably, the separation unit (vi) or (vii) comprises a first inlet receiving at least one salt of a monovalent anion and/or cation and/or at least one salt of a divalent anion and/or cation, in particular a sodium chloride salt (NaCl) and/or a sodium phosphate salt, and:

a first outlet for the monovalent cation salt(s) and a second outlet the divalent cation salt(s), when the first inlet receives monovalent and divalent cation salts; or a first outlet for the monovalent anion salt(s) and a second outlet for the divalent anion salt(s), when the first inlet receives monovalent and divalent anion salts.

Preferably, the separation unit (vi) or (vii) is a nanofiltration unit.

BRIEF DESCRIPTION OF THE DRAWINGS

The invention will be better understood upon reading the following description of embodiments of the invention, given solely as non-limiting examples and with reference to the attached drawings, wherein:

FIG. 1 schematically represents the various steps of a first example of a process for manufacturing a demineralised milk protein composition;

FIG. 2 schematically represents an example of the treatment step v) according to the invention, in particular a unit cell of the bipolar membrane electrodialyser implemented in the first and second example processes shown in FIGS. 1 and 3; and FIG. 3 schematically represents the various steps of a second example of a process for manufacturing a demineralised milk protein composition.

DETAILED DESCRIPTION

The first example of a process for manufacturing a demineralised milk protein composition represented in FIG. 1 comprises two electrodialysers (ED) 5 and 10. The unit cells 15 and 35 have three compartments. The unit cells 35 of ED 10 have three compartments. A single unit cell 15 of the electrodialyser 5 is shown in FIG. 1. This unit cell 15 comprises a first compartment 20 delimited between a cationic permselective membrane 22 and a cationic membrane 24, a second compartment 26 delimited between the cationic membrane 24 and the cationic membrane 28, and a third compartment 30 delimited between the cationic membrane 28 and the cationic permselective membrane 32. A single unit cell 35 of the electrodialyser 10 is shown in FIG. 1. This unit cell 35 comprises a first compartment 39 delimited between a cationic membrane 37 and an anionic membrane 41, a second compartment 43 delimited between the anionic membrane 41 and a cationic membrane 45.

The cationic permselective membranes 22 and 32 can only be crossed by monovalent cations. The electrodialysers 5 and 10 each comprise a cathode (80, 88) and an anode (78, 90) generating a current through the conductive solutions passing through the compartments of the unit cells 15 and 35.

Figure 2:
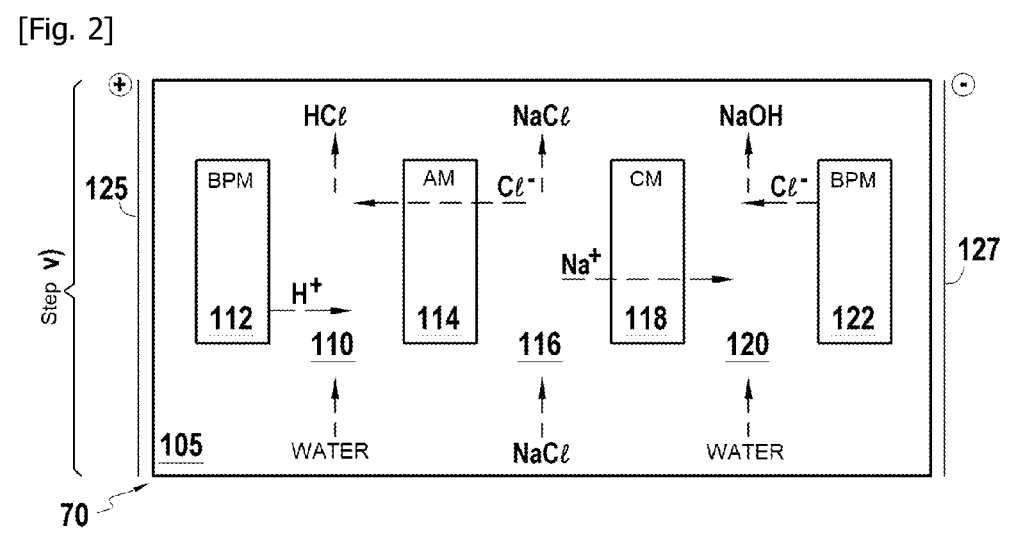

The process can also comprise a first nanofiltration device 50 for performing step vi), and/or a second nanofiltration device 60 for performing step vii), and/or a bipolar membrane electrodialyser 70 for performing step v) according to the invention, in particular detailed in FIG. 2. This first example process also comprises a heat treatment unit 75 for carrying out the heat treatment step viii), in particular a pasteurisation.

In operation, a milk protein composition MPC, in particular a whey, optionally demineralised to at least 30%, is supplied in a step i) and then supplied to the second compartment 26 of the electrodialyser 5 for the performance of step (ii). At the same time, acidified salt, in particular a hydrochloric acid solution, is supplied to the first compartment 20, and brine, in particular a sodium chloride salt, is supplied to the third compartment 30. The $H^+$ ions cross the cationic membrane 24 and are replaced by $Na^+$ ions coming from the third compartment 30 and thus passing through the permselective membrane 32 or 22 under the effect of the electric field. The monovalent and/or divalent cations, in particular Na$^+$ ions and Ca$^{2+}$ ions, cross the cationic membrane 28, under the effect of the electric field, in the direction of the cathode 80, and are substituted by H$^+$ ions coming from the first compartment 20. The milk protein composition obtained MPC1 in step i) is thus partially demineralised, the cations having been substituted by H$^+$, and acidified. The pH of MPC1 is less than or equal to 4. The third compartment 30 comprises a mixture of chloride salts, in particular a calcium chloride salt (CaCl$_2$) and a sodium chloride salt (NaCl), derived from the milk protein composition MPC. The monovalent ions (e.g. Na$^+$; K$^+$) thus cross the cationic permselective membrane 22 or 32 and supply the first compartment 20 while the divalent ions (e.g. Ca$^{2+}$) remain in the third compartment 30.

The acidified milk protein composition MPC1 can undergo a heat treatment in step viii), (heated to 90° C., for a few minutes) in order to improve its bacteriological stability. Advantageously, as the composition MPC1 is acidified, the heat treatment conditions can be more intense than usual and defined so that the proteins are not altered.

The mixture of salts derived from the third compartment 30 may undergo a nanofiltration step vi) on the nanofiltration unit 50 in order to increase the purity of the sodium chloride salt derived from the third compartment 30 by retention of divalent salts, such as calcium chloride CaCl$_2$. The purified sodium chloride salt is thus supplied to the third compartment 30.

The composition MPC1, in particular pasteurised, undergoes a second electrodialysis step iii) on the electrodialyser 10.

The first compartment 39 is supplied with thermised and acidified MPC1.

The second compartment 43 receives water. The anions (chlorides, phosphates) cross the anionic membrane 41 and are retained in the second compartment. The cations (sodium, magnesium) cross the cationic membrane 37, and remain in the brine compartment. The recovered composition MPC2 is thus demineralised and deacidified.

In the second compartment 43, the mixture of sodium chloride and/or potassium chloride salts (NaCl ,KCl) and phosphate salts, derived from MPC1, can undergo a nanofiltration step vii) enabling an increase in the purity of the sodium or potassium chloride salt by retention of the phosphate ions.

The process according to the invention, and in this example specified as the first process example, can advantageously also comprise a treatment step v) of the sodium or potassium chloride salt on a three-compartment bipolar membrane electrodialysis unit 70 enabling the regeneration of the acid, mainly HCl, and the base, mainly sodium or potassium hydroxide, from:

the flows of the salt(s), in particular NaCl and/or KCl, derived from the first compartment 20 of cationic electrodialysis step ii), and/or optionally NaCl and/or KCl derived from the pre-demineralisation step(s) carried out upstream on the composition MPC of step i);

and/or food grade NaCl and/or KCl;

and/or flows of NaCl and/or KCl derived from step (vi) and/or step (vii).

Said pre-demineralisation step preferably consists of a nanofiltration step.

In a preferred embodiment, the basic salt recycled in step (v) is added to MPC1 in the compartment 39, in particular during the extraction of anions and cations, i.e. under the effect of an electric field.

In another embodiment, the electrodialyser 10 is stopped, then a basic salt is added to MPC1 in compartment 39, then the electrodialyser is restarted in order to continue the demineralisation.

In an embodiment, optionally combined with one or other of the two preceding embodiments, a basic solution is added after step (iii).

With the exception of the salt used at the start of step v), the acidic and basic salts used for the implementation of the electrodialysis steps ii) and iii) are derived from the milk protein composition MPC1, which avoids the introduction of exogenous mineral compounds.

FIG. 2 shows the electrodialyser 70 and a unit cell 105 thereof comprising a first compartment 110 delimited between a bipolar membrane 112 and an anionic membrane 114, a second compartment 116 delimited between the anionic membrane 114 and a cationic membrane 118, and a third compartment 120 delimited between the cationic membrane 118 and a bipolar membrane 122. The salt, in particular sodium or potassium chloride, is supplied to the second compartment 116. The chloride ions cross the anionic membrane 114 under the effect of the electric field toward the anode 125 while the Na$^+$, K$^+$ ions cross the cationic membrane under the effect of the electric field to the cathode 127. This step v) allows regeneration of the acidic and basic salts, in particular hydrochloric acid and sodium hydroxide, which are then supplied for the acidic salt to the first compartment of the unit cell 15 or 215 of step ii), and/or for the basic salt to the first compartment 39 or 239 of the unit cell 35 or 235 of step iii) during the step of adding at least one basic solution according to the invention.

The second example of a process for manufacturing a demineralised milk protein composition represented in FIG. 3 comprises two electrodialysers 200 and 205. The electrodialyser 200 comprises unit cells 215 (each) comprising three compartments. The electrodialyser 205 comprises unit cells 235 (each) comprising two compartments. A single unit cell 215 of the electrodialyser 200 is shown in FIG. 3. This unit cell 215 comprises a first compartment 220 delimited between an anionic membrane 222 and a cationic membrane 224, a second compartment 226 delimited between the cationic membrane 224 and the cationic membrane 228, and a third compartment 230 delimited between the cationic membrane 228 and the anionic membrane 232.

A single unit cell 235 of the electrodialyser 205 is also shown in FIG. 3. This unit cell 235 comprises a first compartment 239 delimited between a cationic membrane 237 and an anionic membrane 241, a second compartment 243 delimited between the anionic membrane 241 and a cationic membrane 249.

The electrodialysers 200 and 205 each comprise an anode (278, 290) and a cathode (280, 288) generating a current through the conductive solutions passing through the compartments of the unit cells 215 and 235.

The process can also comprise a first nanofiltration device 250 for performing step vi), and/or a second nanofiltration device 260 for performing step vii), and/or a three-compartment bipolar membrane electrodialyser 70, in particular detailed in FIG. 2, for performing step v).

Moreover, the process may comprise a heat treatment unit 275 for carrying out the heat treatment step viii), in particular a pasteurisation.

In operation, a milk protein composition MPC, in particular whey, demineralised to at least 30%, is supplied to the second compartment 226 of the electrodialyser 200. At the same time, acidified salt, in particular a hydrochloric acid solution, is supplied to the first compartment 220, and water is supplied to the third compartment 230. Only the $H^+$ ions cross the cationic membrane 224 to the second compartment 226 towards the cathode 280, and the chloride ions cross the anionic membrane 232 to the third compartment 230 towards the anode 278. In the second compartment 226, the monovalent or divalent cations, such as $Na^+$ and $Ca^{2+}$, cross the cationic membrane 228 under the effect of the electric field towards the cathode 280, and are substituted by $H^+$ ions coming from the first compartment 220. The milk protein composition MPC1 obtained in step ii) is thus partially demineralised, the cations having been substituted by $H^+$ ions and acidified. The pH of MPC1 is less than or equal to 4. The third compartment 230 comprises a mixture of $CaCl_2$ and NaCl derived from the milk protein composition MPC. Chloride ions from the first compartment 220 cross the anionic membrane 222 or 232 and supply the third compartment 230.

The acidified milk protein composition MPC1 preferably undergoes a heat treatment in step viii), in particular a thermisation step (heated to 90° C., for a few minutes) in order to improve its bacteriological stability.

Advantageously, since the composition MPC1 is acidified, the conditions of the heat treatment can be defined so that the proteins are not altered.

The mixture of salts derived from the third compartment 230 may undergo nanofiltration step vi) on the nanofiltration unit 250 in order to increase the purity of the sodium chloride salt derived from the third compartment 230 by extraction of divalent salts, such as calcium chloride $CaCl_2$. This step may optionally be followed by a chelating resin run to achieve the 3-5 ppm input specification of step v).

The composition MPC1, in particular thermised, undergoes a second electrodialysis step iii) on the electrodialyser 205.

The first compartment 239 is supplied with thermised and acidified MPC1.

The second compartment 243 receives water. The anions (chlorides, phosphates) cross the anionic membrane 241 and are retained in the second compartment 243. The cations (sodium, magnesium) cross the cationic membrane 237, and remain in the brine compartment (243). The composition MPC2 recovered in step iv) is thus demineralised and deacidified.

In the second compartment 243, the mixture of sodium chloride and/or potassium chloride salts (NaCl ,KCl) and phosphate salts, derived from MPC1, can undergo nanofiltration step vii) enabling an increase in the purity of the sodium chloride salt by retention of the phosphate ions.

The process according to the invention, and in particular this second process example, can advantageously also comprise a treatment step v) of the sodium or potassium chloride salt on a three-compartment bipolar membrane electrodialysis unit, in particular the electrodialyser 70 shown in FIG. 2 and described above, enabling the regeneration of the acid, mainly HCl, and the base, mainly sodium or potassium hydroxide, from:

salt flows, in particular NaCl and/or KCl derived from the pre-demineralisation step(s) carried out upstream on the composition MPC of step i);

and/or food grade NaCl and/or KCl;

and/or flows of NaCl and/or KCl derived from step (vi) and/or step (vii).

Said pre-demineralisation step preferably consists of a nanofiltration step.

In a preferred embodiment, the basic salt recycled in step (v) is added to MPC1 in the compartment 239, in particular during the extraction of anions and cations, i.e. under the effect of an electric field.

In another embodiment, the electrodialyser 205 is stopped, then a basic salt is added to MPC1 in compartment 239, then the electrodialyser 205 is restarted in order to continue the demineralisation.

In an embodiment, optionally combined with one or other of the two preceding embodiments, a basic solution is added after step (iii).

With the exception of the salt used at the start of step v), the acidic and basic salts used for the implementation of the electrodialysis steps ii) and iii) are derived from the milk protein composition MPC1, which avoids the introduction of exogenous mineral compounds.

The second process example differs from the first example through the use of permselective membranes in step (ii).

Cationic substitution step ii) can be carried out on either electrodialyser 5 (FIG. 1) or 200 (FIG. 3).

For carrying out the tests described below, a milk protein composition, MPC, was made by preparing a dispersion of (raw) sweet whey powder, at 16% dry mass in demineralised water. The dispersion is mechanically stirred until a homogeneous mixture is obtained. MPC thus presents the following parameters: mass rate in dry matter: 15.9% (powder mass/total mass); pH=5.95; initial conductivity: 10.95 mS/cm; ash content by mass: 8.1%; lactose content by mass: 73.5%; cation content by mass (in particular Na, NHa, K, Ca, Mg): 3.79%; anion content by mass (in particular Cl, $NO_3$, $PO_4$, $SO_4$): 3.64%; the various mass rates (except for that in dry matter) are calculated by relating the total mass of one or more compounds to the total mass of the dry matter.

1—Cationic Substitution on the Electrodialyser 200 (FIG. 3)

The electrodialyser 200 comprises, for example, from 5 to 15 cells 215.

The first compartment 220 is supplied with an HCl solution having a conductivity greater than or equal to 100 mS/cm, in particular greater than or equal to 150 mS/cm. The second compartment 226 is supplied with MPC exemplified above. The third compartment is initially supplied with an NaCl solution having a conductivity less than or equal to 50 mS/cm, in particular less than or equal to 25 mS/cm, in this specific example less than or equal to 15 mS/cm. A current (I) greater than or equal to 1 ampere, in particular less than or equal to 2 amperes, is applied to the electrodialyser 200, and the voltage is preferably left free. During electrodialysis ii), the conductivity of MPC decreases indicating its demineralisation, and then it increases because the cations it comprises are substituted by $H^+$ ions. The pH of MPC1 obtained is of the order of 1, and the conductivity of MPC1 is approximately 12 mS/cm. The conductivity of the acidic solution, i.e. HCl, at the outlet of the first compartment 220 is lowered by about 74%, and the conductivity of the brine, i.e. NaCl, obtained at the outlet of the third compartment 230, is increased by approximately 234%. The cation removal is about 84%.

2—Cationic Substitution on the Electrodialyser 5 (FIG. 1)

The electrodialyser 5 comprises, for example, from 5 to 15 cells 15. The first compartment 20 is supplied with an HCl solution having a conductivity greater than or equal to 100 mS/cm, in particular greater than or equal to 150 mS/cm. The second compartment 26 is supplied with MPC exemplified above. The third compartment is initially supplied with an NaCl solution having a conductivity less than or equal to 50 mS/cm, in particular less than or equal to 25 mS/cm, in this specific example less than or equal to 15 mS/cm. A current (I) greater than or equal to 1 ampere, in particular less than or equal to 2 amperes, is applied to the electrodialyser 5, and the voltage is preferably left free. At the start of electrodialysis ii), the conductivity of MPC decreases indicating its demineralisation, and then it increases because the cations it comprises are substituted by $H^+$ ions. In the acidic compartment 20, the conductivity decreases due to the depletion of $H^+$ ions and the production of NaCl, which is less conductive.

The cations extracted from MPC migrate into the brine compartment 30, which is enriched in multivalent cations more conductive than NaCl. The pH of MPC1 obtained is of the order of 1, and the conductivity of MPC1 is approximately 12 mS/cm. The conductivity of the acidic solution at the outlet of the first compartment 220 is lowered by about 35%, and the conductivity of the brine obtained at the outlet of the third compartment 30 is increased by approximately 25%. The cation removal is about 82%.

For the implementation of step iii), MPC1 used may be either that from electrodialyser 5 or 200 since the latter have identical performance in terms of cation removal rate.

For carrying out the tests described below, a milk protein composition, MPC", was made by preparing a dispersion of (raw) sweet whey powder at 17% dry mass in demineralised water. The dispersion is mechanically stirred until a homogeneous mixture is obtained. MPC" thus presents the following parameters: mass rate in dry matter: 17% (powder mass/total mass); pH=5; initial conductivity: 12 mS/cm; ash content by mass: 8%; lactose content by mass: 74%; cation content by mass (in particular Na, $NH_4$, K, Ca, Mg): 5%; anion content by mass (in particular Cl, $NO_3$, $PO_4$, $SO_4$): 3%; the various mass rates (except for that of dry matter) are calculated by relating the total mass of one or more compounds to the total mass of the dry matter.

3. Cationic Substitution on the Electrodialyser 200 (ESC) (FIG. 3)

The electrodialyser 200 comprises, for example, 5 to 15 cells 215. The first compartment 220 is supplied with an HCl solution having a conductivity greater than or equal to 100 mS/cm, in particular greater than or equal to 150 mS/cm. The second compartment 226 is supplied with MPC" exemplified above. The third compartment is supplied with an NaCl solution having a conductivity less than or equal to 50 mS/cm, in particular less than or equal to 25 mS/cm, in this specific example less than or equal to 15 mS/cm. A current (I) greater than or equal to 2 amperes, in particular less than or equal to 3 amperes, is applied to the electrodialyser 200, and the voltage is preferably left free. During electrodialysis ii), the conductivity of MPC" decreases indicating its demineralisation, and then it increases because the cations it comprises are substituted by $H^+$ ions. The pH of MPC1" obtained is of the order of 2, and the conductivity of MPC1" is approximately 12 mS/cm. The conductivity of the acidic solution, i.e. HCl, at the outlet of the first compartment 220 is lowered by about 53%, and the conductivity of the brine, i.e. NaCl, obtained at the outlet of the third compartment 230, is increased by approximately 292%. The cation removal (or substitution rate) is approximately 77%. The rate for anions is substantially the same for MPC" and MPC1".

4. Conventional Two-Compartment Electrodialysis (ED) (Anionic Membrane/Cationic Membrane) (for Example Step (iii) 10 or 205 of FIG. 1 or 3)

This electrodialyser comprises, for example, 5 to 15 cells. The first compartment is supplied with above-described MPC1" and the second compartment is initially supplied with a salt, in particular sodium chloride, having a conductivity greater than or equal to 5 ms/cm and less than or equal to 15 ms/cm. During the test, a voltage greater than or equal to 10 V and less than or equal to 20 V, in particular less than or equal to 15 V, is applied to the two-compartment electrodialyser, and the current (I) is left free. During the test, the conductivity of MPC1" decreases, indicating its demineralisation. Part of the $H^+$ ions are extracted in the brine compartment, hence the increase of the pH of MPC1" (ESC+ED) at the outlet, in particular at a pH greater than or equal to 2.5, in particular greater than or equal to 3. The final conductivity of MPC1" (ESC+ED) is lowered, by approximately 90% compared with MPC, through this conventional electrodialysis. The cation removal rate (Na, $NH_4$, K, Ca, Mg) in MPC1" (ESC+ED) is greater than or equal to 90% (compared with MPC1" obtained at the outlet of the cation substitution ED, FIG. 3). The anion removal rate (Cl, $NO_3$, $PO_4$, $SO_4$) in MPC1" (ESC+ED) is greater than or equal to approximately 80% (compared with MPC1" obtained at the outlet of the cationic substitution ED, FIG. 3).

It is possible to add a basic solution (for example a sodium hydroxide solution at 5% m/m) to the recovered MPC2 in order to adjust its pH to the desired pH.

It is also possible to add said basic solution in the compartments of the electrodialyser of step (ii) receiving MPC1 concomitantly with the extraction of cations and anions, and therefore under the application of the electric fields. This route makes it possible to increase the pH while demineralising MPC1. Moreover, a synergy effect has been observed because the extraction of phosphate ions, and of calcium and magnesium ions, is improved compared with a demineralisation using an ED without addition of a base.

For carrying out the tests described below, a milk protein composition, MPC(A) was provided at 23% dry mass. The milk protein composition is sweet whey, pre-concentrated by evaporation. MPC(A) thus presents the following parameters: mass content in dry matter: 23% (dry mass/total mass); pH=6.04; initial conductivity: 12.2 mS/cm; ash content by mass: 7.6% (% ash mass/total dry mass); mass content in TNM: 15.7% (% TNM mass/total dry mass); 541 mg Na/100 g total dry matter; 2269 mg K/100 g total dry matter; 513 mg Ca/100 g total dry matter; 104 mg Mg/100 g total dry matter; 1357 mg Cl/100 g total dry matter; 640 mg phosphorus/100 g total dry matter.

5. Cationic Substitution on the Electrodialyser 200 (ESC) (FIG. 3)

The electrodialyser 200 comprises, for example, 5 to 25 cells 215. The first compartment 220 is supplied with an HCl solution having a conductivity greater than or equal to 100 mS/cm, in particular greater than or equal to 150 mS/cm. The second compartment 226 is supplied with MPC(A) exemplified above. The third compartment is supplied with water. A current (I) greater than or equal to 2 amperes, in particular less than or equal to 10 amperes, is applied to the electrodialyser 200, and the voltage is preferably left free. During electrodialysis ii), the conductivity of MPC(A)' decreases indicating its demineralisation, and then it increases because the cations it comprises are substituted by $H^+$ ions. The pH of MPC(A) obtained is of the order of 2, and the conductivity of MPC1(A) is approximately 8.0 mS/cm. The conductivity of the acidic solution, i.e. HCl, at the outlet of the first compartment 220 is lowered, and at the outlet of the third compartment 230, the water is loaded with ions and comprises a brine at the outlet. The following profile is obtained for the cations of MPC1(A): 166 mg Na/100 g total dry matter; 378 mg K/100 g total dry matter; 314 mg Ca/100 g total dry matter; 79 mg Mg/100 g total dry matter. The concentration of anions is substantially the same between MPC(A) and MPC1(A).

6. Conventional Two-Compartment Electrodialysis (ED) (Anionic Membrane/Cationic Membrane) (for Example Electrodialyser 10 or 205 of FIG. 1 or 3)

This electrodialyser comprises, for example, 5 to 50 cells. The first compartment is supplied with MPC1(A) described above and the second compartment is supplied with water. During the test, a voltage greater than or equal to 10 V and less than or equal to 50 V, in particular less than or equal to 40 V, is applied to the two-compartment electrodialyser, and the current (I) is left free. During the test, the conductivity of MPC(A) decreases, indicating its demineralisation. A part of the $H^+$ ions is extracted in the brine compartment, giving the increase in pH of MPC1(A) the outlet.

In an embodiment, the addition of a basic solution at 5% (m/m) is carried out on MPC2 after step (iii) and not during step (iii).

In this case, the pH of MPC2 obtained at the conclusion of step (iii) (before addition of sodium hydroxide) is of order 4.5. MPC2 at the outlet of step (iii) has a conductivity of order 0.3 mS/cm. The following ionic profile is obtained: approximately 0 mg Na/100 g total dry matter; 0 mg K/100 g total dry matter; 35 mg Ca/100 g total dry matter; 19 mg Mg/100 g total dry matter; 14 mg Cl/100 g total dry matter; 206 mg phosphorus/100 g total dry matter. The rate of removal of cations is 98%, and the rate of removal of anions is 89%.

In another embodiment, the addition of the basic solution is carried out on MPC1 during step (iii) simultaneously with the extraction of anions and cations, under the application of an electric field. A sodium hydroxide solution (NaOH) at 5% (m/m) is added in the compartments of the electrodialyser in step (iii) comprising MPC1. Preferably, this addition is carried out after a reduction of approximately 75% in the conductivity observed on the ED (iii). Preferably, the addition of sodium hydroxide is carried out when MPC1 has a conductivity less than or equal to 1 mS/cm, in this specific example of order 0.5 mS/cm, and/or at a pH greater than or equal to 3, in particular greater than or equal to 4.

In this case, the pH of MPC2 obtained at the conclusion of step (iii) is of order 5.2. MPC2 at the outlet of step (iii) has a conductivity of order 0.3 mS/cm. The following ionic profile is obtained: approximately 53 mg Na/100 g total dry matter; 0 mg K/100 g total dry matter; 24 mg Ca/100 g total dry matter; 13 mg Mg/100 g total dry matter; 9 mg Cl/100 g total dry matter; 160 mg phosphorus/100 g total dry matter. The ash content is 0.50% (% ash mass/total dry mass). The rate of removal of cations is 97%, and the rate of removal of anions is 92%.

The addition of a basic solution during the ED (iii) under the application of an electric field makes it possible to improve the extraction of phosphate ions and of divalent cations compared to an ED (iii) without addition of the basic solution.

In a comparative embodiment, step (ii) does not comprise the addition of a basic solution, and the demineralisation process comprises a step of exclusively anionic substitution on an electrodialyser, the cells of which comprise three compartments MPC2(A), as described in the present text, carried out after step (ii). In this case, the pH of the milk protein composition obtained is of order 5.4, for a conductivity of order 0.2 mS/cm.

The following ionic profile is obtained: approximately 19 mg Na/100 g total dry matter; 2 mg K/100 g total dry matter; 39 mg Ca/100 g total dry matter; 37 mg Mg/100 g total dry matter; 11 mg Cl/100 g total dry matter; 110 mg phosphate/100 g total dry matter. The ash content is 0.40% (% ash mass/total dry mass). The mass fractions of divalent cations are greater than those obtained above compared with step (iii) during a period in which a basic solution is added.

The step (iii) with addition of a base during the latter under an electric field, combined with step (ii), allows an improvement in the extraction of divalent cations of approximately 30% and in the extraction of phosphates of approximately 20% compared with step (iii) without the addition of sodium hydroxide during the latter and combined with (ii), and the extraction of divalent cations of approximately 44% compared with the comparative embodiment.

The step (iii) described in point 6, can also be applied to MPC1 obtained in point 1 or point 2 in order to obtain MPC2.

The invention claimed is:

1. A process for manufacturing a demineralised milk protein composition (MPC2), wherein it comprises the following steps:
   (i)—providing a milk protein composition (MPC) comprising anions, monovalent cations and divalent cations;
   (ii)—electrodialysis of the milk protein composition (MPC) on a first electrodialyser, said first electrodialyser comprising unit cells, each unit cell comprises three compartments: a first compartment supplied with at least acid salt, a second compartment delimited between two cationic membranes and receiving said milk protein composition (MPC), and a third compartment, wherein each unit cell is configured to substitute at least a part of the monovalent cations and divalent cations of the milk protein composition (MPC) by hydrogen ions $H^+$ coming from the first compartment in the milk protein composition (MPC) to obtain an at least partially demineralised and acidified milk protein composition (MPC1) having a pH less than or equal to 4, wherein step (ii) is a step of substitution exclusively of cations;
   (iii)—electrodialysis of the milk protein composition (MPC1) obtained in step (ii) on a second electrodialyser, said electrodialysis step (iii) comprises the extraction of both anions and cations; wherein said process comprises the addition of at least one basic solution to the milk protein composition during at least one of the following: during step (iii); during step (iii) and after step (iii); after step (iii), to raise the pH of the milk protein composition (MPC1);
   (iv)—recovering the demineralised milk protein composition (MPC2).

2. The manufacturing process according to claim 1, wherein the addition of the basic solution is carried out during at least one part of the electrodialysis step (iii) concomitantly with the extraction of ions.

3. The manufacturing process according to claim 1, wherein the addition of the basic solution to the milk protein composition is carried out when the milk protein composition has a conductivity less than or equal to 1 mS/cm, and has a pH greater than or equal to 3.

4. The manufacturing process according to claim 1, wherein after the addition of the basic solution, the milk protein composition has a pH greater than or equal to 4.5.

5. The manufacturing process according claim 1, wherein the milk protein composition recovered in step (iv) (MPC2) comprises phosphate ions ($H_2PO_4^{31}$, $HPO_4^{2-}$, $PO_4^{3-}$), for which the mass of phosphorus is greater than or equal to 110 mg for 100 g of total dry mass of said recovered milk protein composition (MPC2).

6. The manufacturing process according to claim 1, wherein the milk protein composition recovered in step (iv) (MPC2) comprises sodium or potassium ions, the mass of which is greater than or equal to 20 mg for 100 g of total dry mass of said recovered milk protein composition (MPC2).

7. The manufacturing process according to claim 1, wherein it comprises a treatment step (v) of at least part of the salt(s) selected from the following salts:
  the salt(s) derived directly from electrodialysis step ii),
  the salt(s) derived indirectly from electrodialysis step ii),
  the salt(s) derived directly from electrodialysis step iii),
  the salt(s) derived indirectly from electrodialysis step iii),
  the salt(s) from a preliminary demineralisation step carried out on the milk protein composition before step i),
  a mixture of the latter,
  said treatment step (v) being configured to produce one or more acid salts on the one hand, and
  one or more basic salts on the other hand.

8. The manufacturing process according to claim 7, wherein treatment step (v) consists of an electrodialysis step carried out on a bipolar membrane electrodialyser.

9. The manufacturing process according to claim 8, wherein the bipolar membrane electrodialyser, in step (v), comprises unit cells comprising three compartments A, B and C, compartments A and B are supplied with water and compartment C is supplied with at least one salt.

10. The manufacturing process according to claim 9, wherein at least one salt obtained during treatment step (v) is supplied to one of the three compartments of the electrodialyser in step ii).

11. The manufacturing process according to claim 7, wherein the basic solution comprises, at least in part, at least one basic salt obtained during treatment step (v).

12. The manufacturing process according to claim 1, wherein the basic solution is derived, at least in part, from the recycling of an effluent derived from at least one of the following: the step ii); the step ii) and the step iii); and step iii).

13. The manufacturing process according to claim 1, wherein the milk protein composition is selected from the list comprising: whey; a milk ultrafiltration permeate; a milk microfiltration permeate; a whey ultrafiltration retentate, a whey ultrafiltration permeate; a retentate of a milk microfiltration permeate ultrafiltration a permeate of a milk microfiltration permeate ultrafiltration; or a mixture thereof.

14. The manufacturing process according to claim 1, wherein the basic solution is added in the compartments of the electrodialyser of step (iii) comprising the milk protein composition MPC1.

15. The manufacturing process according to claim 1, wherein the addition is carried out on stopping the electrodialyser (iii), then adding the basic solution to the MPC1, then restarting the electrodialyser.

16. The manufacturing process according to claim 2, wherein the addition of the basic solution is carried out during at least one part of electrodialysis step (iii) under the application of an electric field.

17. The manufacturing process according to claim 1, wherein the basic solution is a sodium hydroxide (NaOH) solution or a potassium hydroxide (KOH) solution or a blend thereof.

18. The manufacturing process according to claim 1, wherein the first compartment of the first electrodialyser is delimited between a membrane permselective to monovalent cations, or an anionic membrane, and the cationic membrane of the second compartment.

19. The manufacturing process according to claim 1, wherein the third compartment of the first electrodialyser is delimited between the cationic membrane of the second compartment and a membrane permselective to monovalent cations, or an anionic membrane.

20. The manufacturing process according to claim 1, wherein the first compartment of the first electrodialyser is supplied with hydrochloric acid salt and the third compartment is supplied with at least one chloride salt of monovalent cation or with water.

* * * * *